Patented Aug. 31, 1937

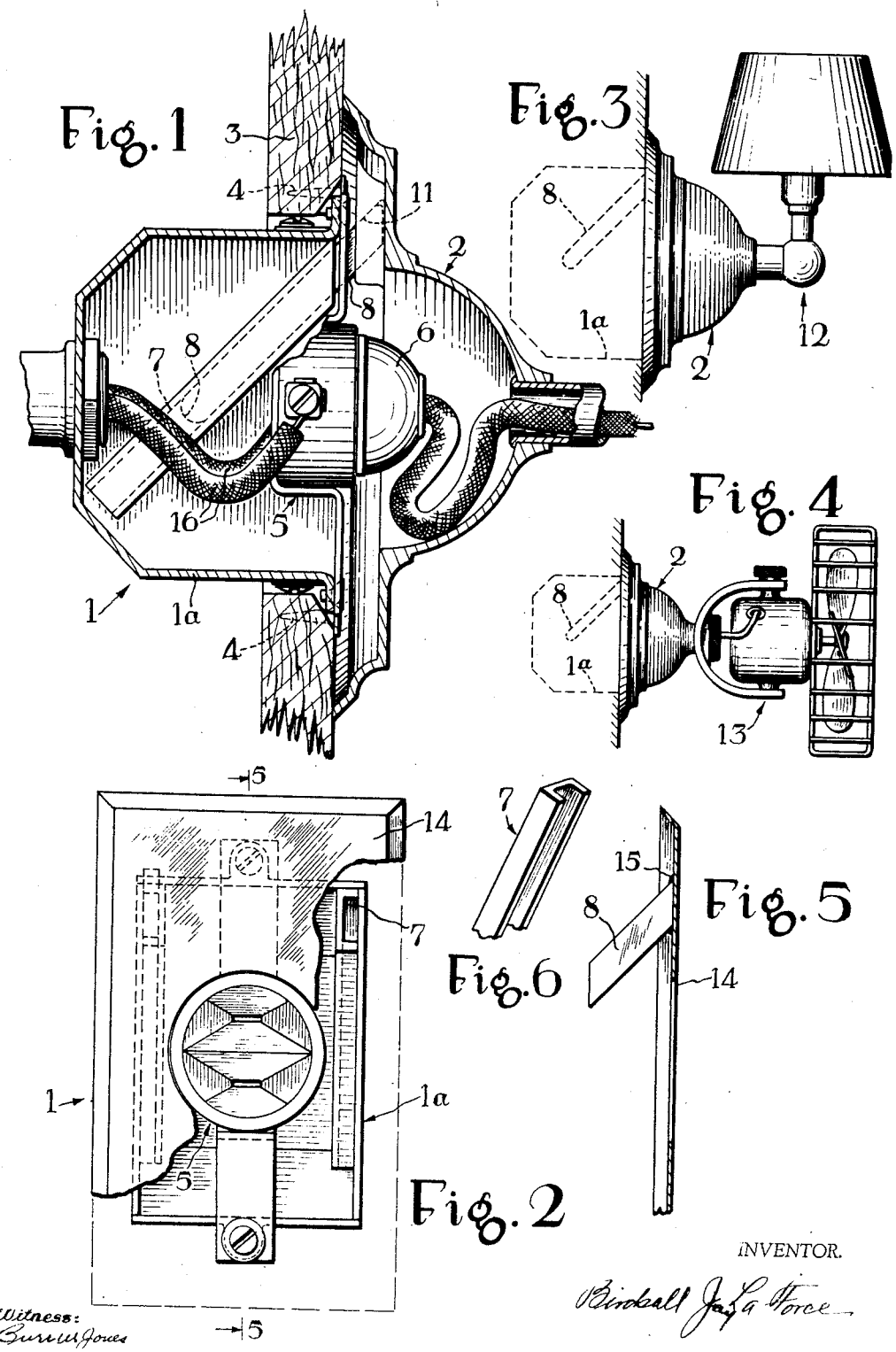

2,091,597

UNITED STATES PATENT OFFICE 2,091,597

ELECTRICAL APPARATUS

Birdsall Jay La Force, Montoursville, Pa.

Application October 7, 1936, Serial No. 104,548

2 Claims. (Cl. 247—29)

The present invention relates to electrical apparatus and more particularly to power outlets of the plug-in type wherein electrical extension lines are united with a power outlet.

In electrical apparatus of this type, it has heretofore been necessary to install wall-mounted accessories, such as lighting fixtures and air-circulating fans, with independent supports apart from the power outlet or else use elements such as screws for attaching the accessory which necessitates the use of a variety of tools and operations.

It is an object of the present invention to provide a device embodying novel securing means for uniting a power outlet to a member to be supported thereby.

Another object is to provide such a device in a manner to facilitate quick and easy exchange of the dependent electrical accessories.

A further object of such a device is to provide an outlet casing with means for quickly attaching any one of a plurality of electrical appliances without operations requiring the use of tools.

A further object is to provide such a device which is strong and rigid and avoids difficult and expensive manufacturing methods.

A further object is to provide such a device by which a cover plate for the power outlet may be easily substituted for an electrical accessory without the use of tools or extraneous elements.

Further objects and advantages will appear to those skilled in this art from the description taken in conjunction with the drawing in which Fig. 1 is a longitudinal cross section of a power outlet assembled together with a member to be supported thereby.

Fig. 2 is a front view of a power outlet showing the cover partially broken away.

Fig. 3 is a side view of a lighting appliance in position to be supported by a power outlet casing.

Fig. 4 is a side view of an air-circulating appliance in assembled relation with a power outlet.

Fig. 5 is a transverse midsectional view on the line 5—5 of Fig. 2 of a cover plate to be used with the power outlet.

Fig. 6 is a fragmentary perspective view of an element of the supporting means.

A power outlet is indicated generally at 1, having a casing 1a and affixed to a wall 3 by suitable means such as screws 4. The base of an electrical accessory or appliance generally indicated at 2 is supported by the outlet casing 1a.

A conventional plug-in type receptacle is illustrated at 5 into which the complementary plug 6 is introduced to make electrical connection to the dependent electrical appliance.

According to the present invention, means are provided for supporting the dependent electrical appliance and may as here shown be a two part device in the form of an extended slot or recess 7 and an interfitting prong or extension 8.

Slot members 7 are preferably formed as best shown in Fig. 2 and Fig. 6 from a U shaped member and may be suitably attached to the power outlet casing 1a as by brazing, welding or lugs.

The prong members 8 are anchored in any suitable way on base 2 of the appliance and may as here shown be seated in a recess 11 formed in the base 2.

The illuminating appliance 12 illustrated in Fig. 3 is attached by means of the present invention to the outlet casing 1a in the same manner as shown in Fig. 1.

The air-circulating device 13 illustrated in Fig. 4 is attached to the outlet casing 1a by means of the present invention in the same manner as in Fig. 1.

A cover plate for the outlet casing 1a as represented in Fig. 5 is provided with supporting members 8 to interfit with slots 7 of Fig. 2.

The supporting members 8 in this embodiment of the invention are attached in any suitable way to the plate 14 as by brazing, or welding as shown at 15.

In utilizing the present invention, an outlet casing 1a having the slots 7 formed within is installed in the wall 3 with the slots extending diagonally upward. Receptacle 5 is then attached to the casing 1a and electrical connections 16 are made. Finally the cover plate 14 is applied to the casing by introducing the extensions 8 into slots 7 and the outlet has the appearance of any conventional outlet now used in homes or offices.

When it is desired to install some electrical appliance such as a lamp (Fig. 3) or fan (Fig. 4), it is merely necessary to remove the plate and introduce the extensions 8 on the base of the appliance into slots 7 of casing 1a.

From the foregoing description and accompanying drawing, it can readily be understood that there is here provided a device by which an electrical outlet can be quickly and easily utilized for a plurality of purposes; that the present invention facilitates the placement of electrical appliances in the most convenient location with a minimum of work and expense and that the present device is strongly constructed and easy to manufacture.

It is understood that the present invention is not exclusive and is not limited by the precise details of description and drawing here given and that changes may be made in the shape and arrangement of the parts, the methods of attachment and other details of the device without departing from the spirit of the invention.

Reference will therefore be made to the appended claims for the scope of my invention in which,

I claim,

1. In combination, an outlet casing and a closure therefor with a mechanical connection therebetween, said connection characterized by a pair of U-shaped members diagonally disposed on the opposing side walls of said outlet casing, and a pair of members carried by said closure and slidable in said U-shaped members to gravitationally restrain said closure against misplacement.

2. In combination, an outlet casing and an electrical device supported thereby with a mechanical connection therebetween, said connection characterized by a pair of U-shaped members diagonally disposed on the opposing side walls of said casing, and a pair of members carried by said device and slidable in said U-shaped members to gravitationally restrain said electrical device against misplacement.

BIRDSALL JAY LA FORCE.